United States Patent
Harada et al.

(10) Patent No.: US 9,957,933 B2
(45) Date of Patent: May 1, 2018

(54) IN-VEHICLE ENGINE CONTROL APPARATUS

(71) Applicant: Mitsubishi Electric Corporation, Tokyo (JP)

(72) Inventors: Kazumasa Harada, Tokyo (JP); Mitsunori Nishida, Tokyo (JP); Osamu Nishizawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 69 days.

(21) Appl. No.: 15/049,302

(22) Filed: Feb. 22, 2016

(65) Prior Publication Data

US 2016/0265469 A1   Sep. 15, 2016

(30) Foreign Application Priority Data

Mar. 12, 2015 (JP) .................................. 2015-049269

(51) Int. Cl.
| | |
|---|---|
| F02M 51/06 | (2006.01) |
| F02D 41/20 | (2006.01) |
| F02D 41/40 | (2006.01) |

(52) U.S. Cl.
CPC ........... *F02M 51/061* (2013.01); *F02D 41/20* (2013.01); *F02D 41/402* (2013.01);
(Continued)

(58) Field of Classification Search
CPC ..... F02M 51/061; F02D 41/402; F02D 41/20; F02D 2200/101; F02D 2041/2034; F02D 2041/2006; F02D 2041/2065
See application file for complete search history.

(56) References Cited

U.S. PATENT DOCUMENTS 5,146,941 A * 9/1992 Statler .................. G05D 7/0635
                                                 137/468
6,866,027 B1 * 3/2005 Marchesini ............... F02D 9/10
                                                 123/337
(Continued)

FOREIGN PATENT DOCUMENTS

JP          5-52145 A    3/1993
JP    2005-337038 A    12/2005
(Continued)

*Primary Examiner* — Joseph Dallo
*Assistant Examiner* — Kurt Liethen
(74) *Attorney, Agent, or Firm* — Sughrue Mion, PLLC; Richard C. Turner

(57) ABSTRACT

A boost switching device (115) for generating a boosted high voltage (Vh) includes a slew rate selection circuit (115s), decreases a selection value (k) to suppress noises when the temperature of the boost switching device (115) is low, and increases the selection value (k) to suppress a temperature increase when the temperature thereof is high. An internal average temperature of an in-vehicle engine control apparatus (100) is detected by an environmental temperature detection device (139), reference data (400) provided in a calculation control circuit unit (130) is used to calculate a relationship between a permissible engine rotational speed (Nk) at which the split injection can be continued at a current measured environmental temperature (Tx) and the selection value (k), and an appropriate selection value (k) corresponding to a current engine rotational speed (Ne) is determined.

16 Claims, 4 Drawing Sheets

(52) U.S. Cl.
CPC ............ *F02D 2041/2006* (2013.01); *F02D 2041/2034* (2013.01); *F02D 2041/2065* (2013.01); *F02D 2200/101* (2013.01); *Y02T 10/44* (2013.01)

(56) References Cited

U.S. PATENT DOCUMENTS

| | | | |
|---|---|---|---|
| 7,415,964 B2* | 8/2008 | Ban | F02D 41/20 123/299 |
| 8,776,763 B2* | 7/2014 | Omori | F02D 41/20 123/445 |
| 2001/0043450 A1* | 11/2001 | Seale | F01L 9/04 361/160 |
| 2005/0126535 A1* | 6/2005 | Nishimaki | F02D 41/20 123/299 |
| 2009/0015223 A1* | 1/2009 | Kakehi | F02D 41/20 323/282 |
| 2009/0159047 A1* | 6/2009 | Eto | F02D 41/20 123/435 |
| 2011/0061929 A1* | 3/2011 | Hwang | H05K 1/141 174/546 |
| 2014/0067233 A1* | 3/2014 | Nishida | F02D 41/20 701/103 |

FOREIGN PATENT DOCUMENTS

| | | |
|---|---|---|
| JP | 2011-241688 A | 12/2011 |
| JP | 2013-7314 A | 1/2013 |
| JP | 5462387 B1 | 4/2014 |

\* cited by examiner

| | REFERENCE DATA 400 | | | | | | |
|---|---|---|---|---|---|---|---|
| ENVIRONMENTAL TEMPERATURE Ta | -30 | -20 | ... | Tx | ... | 100 | 110 |
| PERMISSIBLE ROTATIONAL SPEED | SELECTION 1 | D11 | D12 | ... | INTERPOLATION N1 | ... | D14 | D15 |
| | SELECTION 2 | D21 | D22 | ... | INTERPOLATION N2 | ... | D24 | D25 |
| | SELECTION 3 | D31 | D32 | ... | INTERPOLATION N3 | ... | D34 | D35 |

IN-VEHICLE ENGINE CONTROL APPARATUS

BACKGROUND OF THE INVENTION

1. Field of the Invention

The present invention relates to an improvement of an in-vehicle engine control apparatus for injecting a fuel for a plurality of times in one combustion cycle of an internal combustion engine, and more particularly, to an in-vehicle engine control apparatus for suppressing a temperature increase in a fuel injection control unit resulting from the plurality of injections.

2. Description of the Related Art

In a fuel injection multi-cylinder engine, exhaust gas purification and an increase in fuel efficiency that are suited to a load state are carried out by, for example, a batch injection method of carrying out the fuel injection once in one combustion cycle of each cylinder, a split injection method of carrying out a plurality of split injections to inject the same amount of fuel in total, and an intermittent split injection method of alternately repeating the batch injection and the split injection.

Note that, the split injection includes various forms ranging from a two-split injection, which includes an early-stage fuel injection in the intake stroke and a late-stage fuel injection in the compression stroke, up to the maximum five-split injection, which includes a pilot injection in the compression stroke, a pre injection, a main injection, and an after injection in the power stroke, and a post injection in the exhaust stroke.

For example, according to FIG. 3, FIG. 4, and FIG. 8 of Japanese Patent Application Laid-open No. 2005-337038, which is titled "Fuel injection control apparatus", the following configuration is disclosed. Specifically, among a plurality of charge FETs 35 (boost switching devices according to the present invention) for generating boosted high voltages, four separation FETs 36 (quick power supply switching devices according to the present invention) for applying the boosted high voltages to a plurality of injectors 20, and constant current FETs 37 (power supply switching devices according to the present invention) for supplying power from a battery power supply to the injectors 20, a thermistor 41 for detecting an ambient temperature Ta of those FETs 35 to 37 is provided. Further, a temperature difference between the ambient temperature Ta in a case of an operation under the severest condition and a junction temperature Tj of each of the FETs 35 to 37 is calculated and stored in advance, a maximum junction temperature Tjmax is calculated by adding each of the temperature differences to the actual ambient temperature Ta, and when the maximum junction temperature Tjmax is more than a predetermined temperature (such as 150° C.) for determining an overheat state, the number of split stages (up to five stages) of the split injections is decreased. In this manner, an increase in temperature is suppressed.

Moreover, according to FIG. 10A and FIG. 10B and descriptions of paragraphs [0055] and [0056], such a description is made that the thermistor 41 is preferably provided so as to be in close contact with a heatsink of the MOSFETs that are components subject to the measurement to measure the ambient temperature Ta at the closest location, and calculation errors in the junction temperatures are consequently reduced.

The fuel injection control apparatus disclosed in Japanese Patent Application Laid-open No. 2005-337038 is configured such that injection thermistor 41 for detecting the closest ambient temperature Ta of the FETs, which are the switching devices subject to the temperature monitoring, is provided, and the number of injection stages are limited so that the junction temperatures of the switching devices calculated and estimated therefrom are equal to or less than the predetermined temperature.

However, while the fuel injection control apparatus is generally installed in an engine room and it is necessary to assume that the temperature in the engine room increases up to 120° C., in order to maintain the junction temperature of the semiconductor devices to be equal to or less than 175° C., the temperature of the heat sink unit representing the internal temperature of the semiconductor devices needs to be managed to be equal to or less than 150° C.

Thus, an increase in the internal temperature permitted for the switching devices in the fuel injection control apparatus is equal to or less than 20° C. to 30° C., and even when the closest temperature of the switching devices is detected, a distribution between the environmental temperature and the temperature increase caused by the self-heat generation, which form the closest temperature, is not detected, and hence there is a problem in that the temperature increase amount of the switching devices cannot be accurately managed, and even when the actual temperature increase is smaller, only control having a margin, which is based on the maximum temperature increase value acquired by assuming the worst state, can be carried out.

SUMMARY OF THE INVENTION

A first object of the present invention is, while focusing on a boost switching device of a boost control circuit unit, which is shared by a plurality of electromagnetic coils for driving electromagnetic valves for fuel injection to generate a boosted high voltage for high speed drive, to provide an engine control apparatus for accurately managing temperature of the boost switching device, to thereby increase an engine rotational speed at which a split injection can be carried out.

A second object of the present invention is to provide an engine control apparatus for suppressing a transient electric power consumption during a switching operation of the boost switching devices, to thereby increase the engine rotational speed at which the split injection can be carried out.

According to one embodiment of the present invention, there is provided an in-vehicle engine control apparatus, including: a drive control circuit unit including a plurality of switching devices for sequentially driving, in order to sequentially drive electromagnetic valves for fuel injection, which are provided to respective cylinders of a multi-cylinder engine, a plurality of electromagnetic coils for driving the electromagnetic valves to open; a boost control circuit unit for generating a boosted high voltage for quickly magnetizing one of the plurality of electromagnetic coils; and a calculation control circuit unit including a microprocessor and a program memory as principal components. The program memory includes a control program to serve as fuel injection command means for generating a fuel injection command signal directed to the plurality of switching devices and split injection command means for determining whether the fuel injection command signal is to be generated once or a plurality of times during each fuel cycle period of one cylinder of the multi-cylinder engine. The boost control circuit unit includes an inductive device to be intermittently magnetized by a boost switching device from an in-vehicle battery and a high voltage capacitor to be charged to the boosted high voltage set as a target by a plurality times of a discharge operation in which electromagnetic energy accumulated in the inductive device is discharged when the boost switching device is opened. The boost switching device includes a slew rate selection circuit for selecting a slew rate, which is a current increase rate after a close command signal is fed, among a plurality of stages, which are one of high and low stages and high, medium, and low stages. The program memory further includes a control program to serve as slew rate selection means for specifying a selection value of the slew rate for the slew rate selection circuit and reference data, which is one of a data table and an approximation equation.

In addition, the reference data includes, as combination data on a plurality of stages, numerical data of a permissible engine rotational speed determined by using the selection value specified for the slew rate selection circuit as a parameter, and using a measured environmental temperature relating to an installation environment of the boost switching device detected by an environmental temperature detection device as a variable. The permissible engine rotational speed is statistical data acquired by experimentally confirming that an internal temperature of the boost switching device is equal to or less than a predetermined permissible limit temperature even when, at the measured environmental temperature, the selection value of the slew rate is applied and a continuous operation is carried out while injection is carried out for a plurality of times. The slew rate selection means is configured to compare a value of an engine rotational speed detected by an engine rotation sensor and a value of the permissible engine rotational speed corresponding to a current measured environmental temperature calculated through interpolation from the reference data with each other, to thereby determine the selection value. The calculation control circuit unit is configured to select the selection value of the slew rate as small as possible under a condition that the internal temperature of the boost switching device corresponding to a current engine rotational speed and the current measured environmental temperature is equal to or less than the predetermined permissible limit temperature, to thereby suppress the current increase rate of the switching device.

As described above, the in-vehicle engine control apparatus according to the one embodiment of the present invention includes the drive control circuit unit for the plurality of electromagnetic coils for the fuel injection, the boost circuit unit for generating the boosted high voltage for the quick power supply, and the calculation control circuit unit for generating the fuel injection command signal for once or a plurality of times in one combustion cycle of one cylinder. The boost switching device includes the slew rate selection circuit. The calculation control circuit unit includes the reference data of the permissible engine rotational speed corresponding to the environmental temperature including the selection value of the slew rate as the parameter and the control program to serve as the slew rate selection means. The slew rate selection means is configured to select the slew rate as small as possible under the condition that the internal temperature of the boost switching device corresponding to the current environmental temperature detected by the environmental temperature detection device, the permissible engine rotational speed calculated from the reference data, and the current engine rotational speed detected by the rotation sensor is equal to or less than the predetermined permissible limit value.

Thus, when the current engine rotational speed is low, the temperature increase in the boost switching device is small, and the environmental temperature does not cause a problem in the internal temperature of the switching device, the slew rate of the switching device is decreased to suppress the current increase rate during the close operation, resulting in such an effect that radio noises may be reduced under a low noise and silent environment.

Moreover, when the current engine rotational speed is high, and the temperature increase in the boost switching device needs to be small, the slew rate of the boost switching device largest in the temperature increase as a result of a plurality of injections is increased to increase a current increase rate during the close operation, thereby decreasing a transient loss during the closing, resulting in such an effect that a plurality of injections may be carried out even at a high environmental temperature.

Moreover, the level of the selection value of the slew rate is based on statistical data acquired in advance in an experimental measurement by using a plurality of in-vehicle control apparatus, and the internal temperature of the boost switching device does not thus need to be estimated by calculation during an actual engine operation, resulting in such an effect that a control load on the microprocessor may be decreased.

DETAILED DESCRIPTION OF THE PREFERRED EMBODIMENTS

First Embodiment

Figure 1:
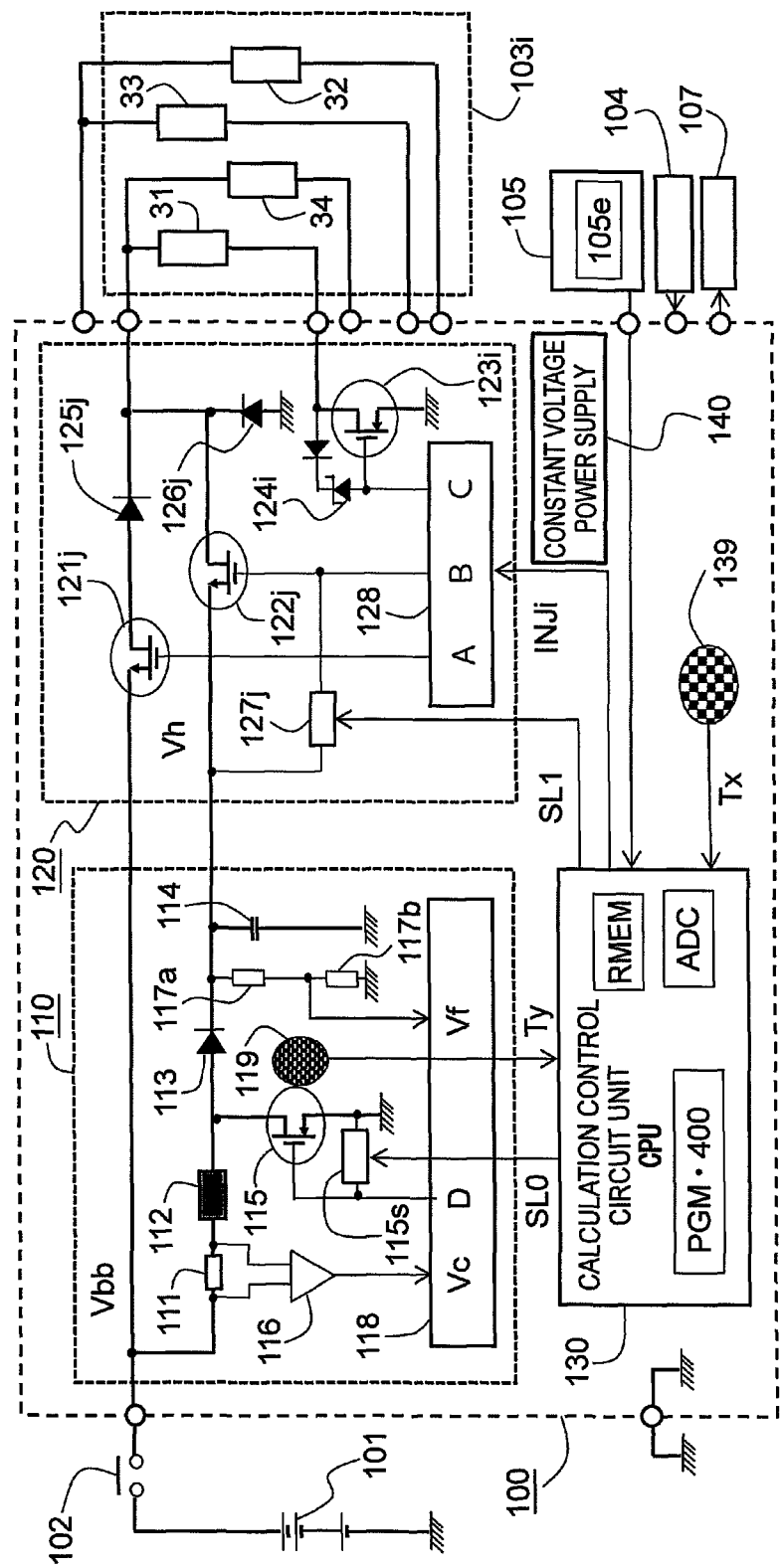
FIG. 1 is a block diagram of an entire circuit of an apparatus according to an embodiment of the present invention.

A description is now given of FIG. 1, which is a block diagram of an entire circuit of an apparatus according to an embodiment of the present invention. In FIG. 1, an in-vehicle engine control apparatus 100 is constructed by, as principal components, a drive control circuit unit 120 for driving electromagnetic coils 103$i$ of electromagnetic valves for fuel injection provided so as to correspond to cylinder numbers i=1, 2, . . . , n of a multi-cylinder engine, a calculation control circuit unit 130 constructed as one-chip or two-chip integrated circuit device along with a boost control circuit unit 110 serving as a high voltage power supply for quickly magnetizing respective electromagnetic coils 31 to 34, and a constant voltage power supply 140 for supplying predetermined stabilized voltages to the respective control circuit units.

First, an in-vehicle battery 101 assumed to be externally connected to the onboard engine control apparatus 100 is configured to supply a power supply voltage Vbb to the onboard engine control apparatus 100 via an output contact of a power supply relay 102.

Note that, the power supply relay 102 is configured to be energized by the closing of a power supply switch (not shown) and to be de-energized by the opening of the power supply switch after a predetermined delay period.

Moreover, a RAM memory RMEM described later is configured to directly receive supply of a minute electric power from the onboard battery 101 via a power supply circuit (not shown).

An analog sensor group 104 is constructed by analog sensors for carrying out drive control for the engine, such as an accelerator position sensor for detecting a degree of depression of an accelerator pedal, a throttle position sensor for detecting a valve opening degree of an intake throttle, an airflow sensor for detecting an intake air amount into the engine, a fuel pressure sensor for injection fuel, an exhaust gas sensor for detecting an oxygen density in an exhaust gas, and a coolant temperature sensor (for a water-cooled engine) for the engine.

An open/close sensor group 105 includes an engine rotation sensor 105e for detecting an engine rotational speed, open/close sensors such as a crank angle sensor for determining a fuel injection timing and a vehicle speed sensor for detecting a vehicle speed, and manual operation switches such as an accelerator pedal switch, a brake pedal switch, a parking brake switch, and a shift switch for detecting a shift lever position of a transmission.

An electric load group 107 (not shown) to be driven by the onboard engine control apparatus 100 is constructed by electric loads of main machinery, such as ignition coils (in case of gasoline engine) and an intake valve control motor, and electric loads of auxiliary machinery, such as a heater for the exhaust gas sensor, the power supply relay for supplying power to loads, an electromagnetic clutch for driving an air conditioner, and alarm/display devices.

Moreover, the electromagnetic coil 103i, which is a specific electric load of the electric load group 107, serves to drive the electromagnetic valve for fuel injection corresponding to a cylinder number i, and the plurality of electromagnetic coils 31 to 34 represent a case of a four-cylinder engine.

Note that, in a case of an inline four-cylinder engine, out of the electromagnetic coils 31 to 34 provided so as to correspond to cylinder arrangement orders 1 to 4, the electromagnetic coils 31 and 34 corresponding to the cylinders 1 and 4 arranged on an outside form a first group, and the electromagnetic coils 33 and 32 corresponding to the cylinders 3 and 2 arranged on an inside form a second group. A fuel injection sequence circulates, for example, in a sequence of the electromagnetic coil 31, the electromagnetic coil 33, the electromagnetic coil 34, the electromagnetic coil 32, and the electromagnetic coil 31 in the stated order. The electromagnetic coils 31 and 34 of the first group and the electromagnetic coils 33 and 32 of the second group alternately carry out the fuel injection so as to reduce a vehicle body oscillation.

Also in cases of an inline six-cylinder engine and an inline eight-cylinder engine, the electromagnetic coils of the divided first and second groups are configured to alternately carry out the fuel injection to reduce the vehicle body oscillation, and to arrange open command signals directed to the electromagnetic valves in the same group so as not to temporally overlap one another.

Then, as an internal configuration of the onboard engine control apparatus 100, the calculation control circuit 130 includes a microprocessor CPU, the RAM memory RMEM for calculation processing, a nonvolatile program memory PGM such as a flash memory, and a multi-channel A/D converter ADC for applying digital conversion, for example, in a sequential conversion form to analog input signals on 16 channels. The program memory PGM includes reference data 400 described later with reference to FIG. 4.

Note that, the program memory PGM can be electrically deleted at once per block. A part of the blocks is used as nonvolatile data memory, and stores important data of the RAM memory RMEM.

The constant voltage power supply 140 receives the supply of the power from the onboard battery 101 via the output contact of the power supply relay 102, generates stabilized voltages such as DC 5 V and DC 3.3 V to supply the power to the calculation control circuit 130, and receives the direct power supply from the onboard battery 101 to generate backup power supply of, for example, DC 2.8 V for maintaining the storage of data stored in the RAM memory RMEM.

In the boost control circuit unit 110 for receiving the power supply voltage Vbb from the onboard battery 101 via the output contact of the power supply relay 102, a current detection resistor 111, an inductive device 112, a charge diode 113, and a high voltage capacitor 114 serially connected to each other and a boost switching device 115 connected between the inductive device 112 and a ground circuit are constructed as a main circuit. The boost control circuit unit 110 is configured such that when the boost switching device 115 closes, and a current flowing through the inductive device 112 becomes equal to or more than a predetermined value, the boost switching device 115 opens, electromagnetic energy accumulated in the inductive device 112 is discharged to the high voltage capacitor 114 via the charge diode 113, and a boosted high voltage Vh, which is a charge voltage of the high voltage capacitor 114, is increased to a target predetermined voltage such as DC 72 V by connecting/disconnecting the boost switching device 115 for a plurality of times.

Note that, the current detection resistor 111 is connected at a location at which both currents flow, which are a drive current when the boost switching device 115 closes and the inductive device 112 is power-supplied and energized, and a capacitor charge current when the boost switching device 115 opens and the electromagnetic energy is discharged from the inductive device 112 to the high voltage capacitor 114. A voltage between both ends of the current detection resistor 111 is amplified by an amplification circuit 116, and is input as a feedback current signal Vc to a feedback control circuit 118.

Moreover, a voltage between both ends of the high voltage capacitor 114 is divided by voltage dividing resistors 117a and 117b, and is input as a feedback voltage signal Vf to the feedback control circuit 118.

The feedback control circuit 118 is configured to generate, when the feedback current signal Vc is less than a predetermined second threshold, a drive gate signal D to drive the boost switching device 115 to close, when the current flowing through the inductive device 112 increases and the feedback current signal Vc becomes more than the second threshold as a result, stop the drive gate signal D to de-energize to open the boost switching device 115, when a predetermined period elapses after the de-energizing and opening or the feedback current signal Vc becomes less than a predetermined first threshold smaller than the second threshold, generate the drive gate signal D again, and subsequently repeat the same intermittent control operation.

On the other hand, the feedback control circuit 118 is configured to enable, when the feedback voltage signal Vf is less than a predetermined voltage somewhat lower than the divided voltage of the target boosted high voltage Vh, the generation of the drive gate signal D to enable the drive to close the boost switching device 115, and when the charge voltage of the high voltage capacitor 114 increases and becomes more than the target boosted high voltage Vh as a result, stop the generation of the drive gate signal D to carry out a hysteresis operation so as not to drive the boost switching device 115 to close.

The drive control circuit unit 120 is constructed by a serial circuit of a power supply switching device 121*j* for applying the power supply voltage Vbb to a common terminal of the electromagnetic coils 31 and 34 of the first group and a backflow prevention diode 125*j*, a quick power supply switching device 122*j* for applying the boosted high voltage Vh, a current supply switching device 123*i* individually provided on a downstream side of each of the electromagnetic coils 31 and 34, and a free wheel diode 126*j* provided between the common terminal and the ground circuit. A voltage limit diode 124*i* is connected to a gate circuit of the current supply switching device 123*i* via a serial diode.

Note that, j is a group number, and is 1 on this occasion, and i is the cylinder number and 1 or 4 on this occasion.

Moreover, as in the case with the first group, the power supply switching device 121*j*, the backflow prevention diode 125*j*, the quick power supply switching device 122*j*, the current supply switching device 123*i*, and the free wheel diode 126*j* are connected to the electromagnetic coils 33 and 32 of the second group. On this occasion, j is 2, and i is 2 or 3.

The gate control circuit 128 is configured to receive a fuel injection command signal INJi from the calculation control circuit 130, and generate a power supply gate signal A for the power supply switching device 121*j*, a quick power supply gate signal B for the quick power supply switching device 122*j*, and a current supply gate signal C for the current supply switching device 123*i*, to thereby drive the respective switching devices to close.

Note that, the fuel injection command signal INJi is a signal that is generated at a predetermined timing based on the crank angle sensor and stops after a predetermined fuel injection period, and in this period, while the power supply switching device 121*j* and the current supply switching device 123*i* corresponding to the cylinder subject to the fuel injection are driven to close, the quick power supply switching device 122*j* is driven to close in a short period from the generation of the fuel injection command signal INJi until the magnetization current for the selected electromagnetic coil 103*i* reaches a predetermined quick magnetization current, the power supply switching device 121*j* maintains the magnetizing current for the electromagnetic coil 103*i* to an open maintenance current while carrying out the intermittent operation, and when the fuel injection command signal INJi is stopped, the power supply switching device 121*j* and the current supply switching device 123*i* are de-energized to open.

Note that, the current supply switching device 123*i* cooperates with the voltage limit diode 124*i* to quickly shut off the magnetization current, resulting in a quick open operation of the electromagnetic valve.

Note that, a current detection resistor (not shown) is provided for each group of the electromagnetic coils 103*i* in order to determine the quick magnetization current and to carry out the open maintenance current control, and the detection signal of the magnetization current is input to the gate control circuit 128.

Returning to the description of the boost control circuit unit 110, the boost switching device 115, which is a field effect transistor, includes a slew rate selection circuit 115*s* for adjusting the drive voltage applied between the gate terminal and the source terminal, to thereby change a slew rate, which is a current increase rate when the transistor is driven to close.

The slew rate selection circuit 115*s* is configured such that, for example, a two-bit selection command signal SL0 is used to select a slew rate among four stages, and hereinafter, a description is given while it is assumed that the microprocessor CPU makes a selection among three stages corresponding to a selection value k of from 1 to 3.

Note that, there is a problem in that an audible radio noise increases when the selection value k of the slew rate is increased, but such an advantage is provided that a transient loss during the closing of the transistor is decreased. Thus, when the engine rotational speed is low and a cabin environment is a low noise/silent environment, the selection value k is decreased, and when the engine rotational speed is high and the temperature increase of the boost switching device 115 is high, the selection value k is increased.

The neighborhood temperature detection device 119 is configured to detect a temperature at the location closest to the boost switching device 115 and input a voltage signal to the microprocessor CPU as a measured neighborhood temperature Ty.

Returning to the description of the drive control circuit unit 120, the quick power supply switching device 122*j* (j=1 or 2), which is a field effect transistor, includes a slew rate selection circuit 127*j* (j=1 or 2) for adjusting the drive voltage applied between the gate terminal and the source terminal, to thereby change a slew rate, which is a current increase rate when the transistor is driven to close.

The object and the effect of the slew rate selection circuit 127*j* are as described above, and may be provided also for the power supply switching device 121*j* and the current supply switching device 123*i*.

Note that, a selection command signal SL1 generated by the microprocessor CPU and directed to the slew rate selection circuit 127*j* is configured to specify the same selection value k as that of the selection command signal SL0 directed to the slew rate selection circuit 115*s*.

Figure 2:
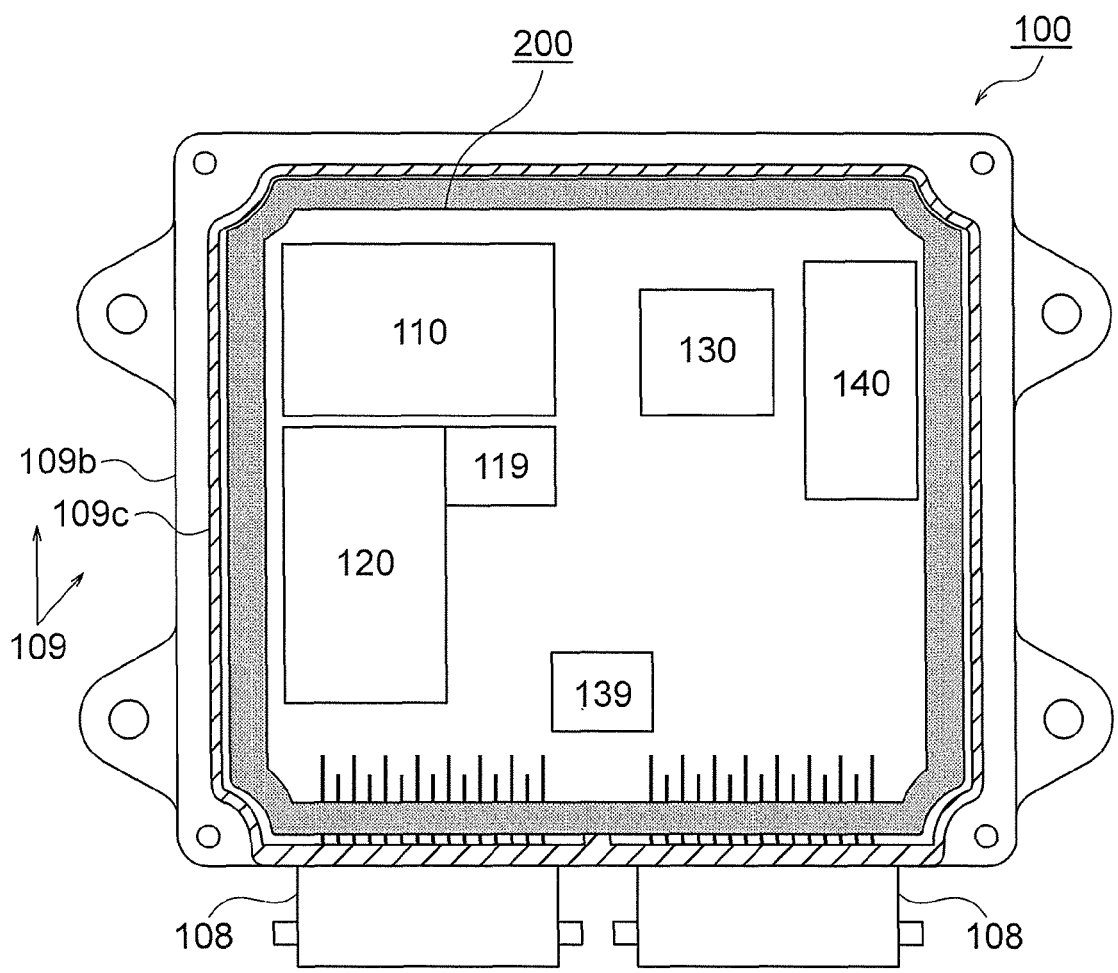
FIG. 2 is a cross sectional view for illustrating a structure of the apparatus of FIG. 1.

The environmental temperature detection device 139 described later referring to FIG. 2 is configured to detect an environmental temperature in the onboard engine control apparatus 100, and input a signal voltage to the microprocessor CPU as a measured environmental temperature Tx.

A description is now given of FIG. 2, which is a cross sectional view for illustrating a structure of FIG. 1. In FIG. 2, the onboard engine control apparatus 100 includes a circuit board 200 stored in a housing 109 constructed by a base 109*b* and a cover 109*c*, and is configured such that a pair of input/output connectors 108 and 108 are exposed to the outside of the housing 109, and a wire harness (not shown) for external wiring is connected to the exposed part.

Main heat generation components mounted on the circuit board 200 include an integrated circuit device in the calculation control circuit unit 130, which is arranged at an approximately center rear portion of the circuit board 200, a plurality of transistors for generating the stabilized voltages such as DC 5 V and DC 3.3 V in the constant voltage power supply 140, which are arranged on a right side surface, the boost switching device 115 and the inductive device 112 in the boost control circuit unit 110, which are arranged on a left side surface, and the two quick power supply switching devices 122*j*, the two power supply switching devices 121*j*, and the four current supply switching devices 123*i* in the drive control circuit unit 120, and additionally, a large number of input resistors in an input interface circuit (not shown) are mounted on a right side surface location.

The neighborhood temperature detection device 119 is provided at a location neighboring the boost switching device 115 in the boost control circuit unit 110, and serves to directly detect absence/presence of abnormal overheat of the boost switching device 115 to give notification of the abnormality.

The environmental temperature detection device 139 is mounted in a temperature distribution area lower than an average temperature relating to a temperature distribution in the housing 109, and serves to measure the environmental temperature Ta of the boost switching device 115 at a location not neighboring high heat generation components including at least the boost switching device 115.

Now, actions and operations of the apparatus constructed as illustrated in FIG. 1 and FIG. 2 according to the embodiment of the present invention are described in detail with reference to FIG. 3, which is a graph for showing characteristic curves relating to a permissible rotational speed of the engine of the apparatus of FIG. 1, FIG. 4, which is a structure diagram of a data table serving as the reference data of the apparatus of FIG. 1, and FIG. 5, which is a flowchart for illustrating an operation of the apparatus of FIG. 1.

First, in FIG. 1, when the power supply switch (not shown) is closed, the output contact of the power supply relay 102 closes, and the power supply voltage Vbb is applied to the onboard engine control apparatus 100.

As a result, the constant voltage power supply 140 generates the stabilized voltages such as DC 5 V and DC 3.3 V, and the microprocessor CPU starts the control operation.

The microprocessor CPU generates load drive command signals directed to the electric load group 107 in response to operation states of the switching sensor group 105 and the analog sensor group 104 and contents of control programs stored in the nonvolatile program memory PRG, and generates the fuel injection command signals INJi directed to the electromagnetic coils 31 to 34, which are specific electric loads of the electric load group 107, via the drive control circuit unit 120.

On the other hand, the boost control circuit unit 110 charges the high voltage capacitor 114 to the target boosted high voltage Vh by the intermittent operation of the boost switching device 115.

During a period in which the fuel injection command signal INJi is generated, one of the pair of the power supply switching devices 121j (j=1 and 2) and one of the four current supply switching devices 123i (i=1 to 4) are driven to close. Further, in the short period immediately after the generation of the fuel injection command signal INJi, one of the pair of the quick power supply switching devices 122j (j=1 and 2) is driven to close, and the quick power supply switching device 122j uses the boosted high voltage Vh to carry out the quick power supply for one of the electromagnetic coil 103i (i=1 to 4) subject to the fuel injection for this time. Then, the power supply switching device 121j intermittently connects the power supply voltage Vbb to supply the open maintenance current, and the current supply switching device 123i quickly shuts off the electromagnetic coil 103i when the fuel injection command signal INJi is stopped. On this occasion, the electromagnetic energy accumulated in the electromagnetic coil 103i is absorbed by the current supply switching device 123i.

Any of the switching devices employs the field effect transistor small in the internal resistance and minute in the close voltage for the on/off control. Thus, a theoretical power consumption in the transistor is represented as (open voltage)×(leakage current during opening)+(close voltage)× (flowing current during closing). The leakage current is minute during the opening and the close voltage is minute during the closing, resulting in a minute power loss.

In practice, however, the switching operation is not carried out momentarily, and a transient power loss is generated by the open voltage and the current supply current in a switching transition process.

The boost switching device 115 is used to sequentially drive the four electromagnetic coils 103i at a high speed, is configured to carry out the intermittent operation for some tens of times during each high-speed drive of the electromagnetic coil 103i to recharge the high voltage capacitor 114, and is thus the most severe switching device in terms of heat generation.

Thus, when a multi-stage split injection of three to five stages is carried out, the boost switching devices 115 and the inductive devices 112 are divided into the respective groups for use, or the engine rotational speed at which at least the multi-stage split injection can be carried out needs to be limited.

The quick power supply switching device 122j is applied with the boosted high voltage Vh and handles a large current, but is provided for each cylinder group, carries out the switching operation once for each fuel injection, and is thus advantageous compared with the boost switching device 115.

A large current temporarily flows through the power supply switching device 121j and then attenuates, but the power supply switching device 121j is advantageous compared with the boost switching device 115 in terms of heat generation because the applied voltage is the power supply voltage Vbb, and the power supply switching device 121j is small in the open maintenance current and is provided for each cylinder group.

The current supply switching device 123i needs to absorb the electromagnetic energy accumulated in the electromagnetic coil 103i upon the shutoff, but is connected to each electromagnetic coil 103i, and is thus a switching device advantageous than the boost switching device 115 in terms of heat generation.

Figures 3, 4:
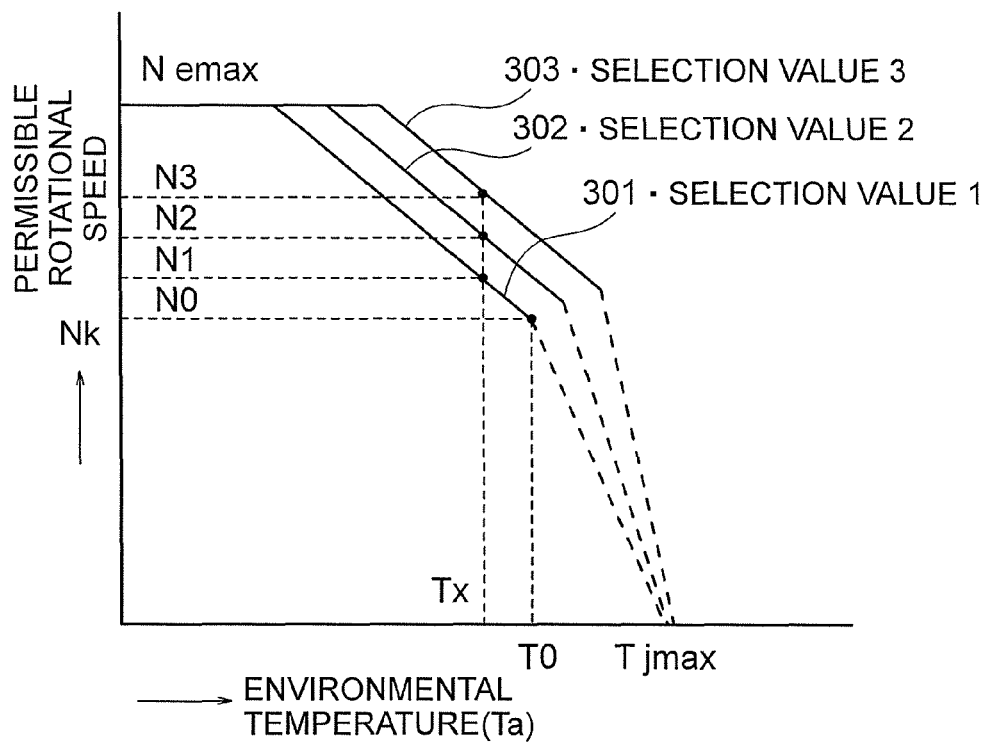
FIG. 3 is a graph for showing characteristic curves relating to a permissible rotational speed of an engine of the apparatus of FIG. 1.
FIG. 4 is a structure diagram of a data table serving as reference data of the apparatus of FIG. 1.

In FIG. 3, which is the graph for showing the characteristic curves relating to the permissible rotational speed of the engine, a horizontal axis represents the environmental temperature Ta inside the engine control apparatus 100 detected by the temperature detection device 139, and a vertical axis represents a permissible engine rotational speed Nk having, as its parameter, the selection value k by the slew rate selection circuit 115s.

Note that, the permissible rotational speed Nk is based on statistical data acquired by experimentally measuring the fact that, for example, when the selection value k of the slew rate is 1, the current value of the environmental temperature Ta is Tx, and the current engine rotational speed Ne measured by the engine rotational sensor 105e is equal to or less than a value of a first permissible rotational speed N1 on a first characteristic curve 301, even when the split injection control continues under the worst condition, the internal temperature of the boost switching device 115 is equal to or less than a permissible limit temperature Tjmax.

For the same measured environmental temperature Tx, for a second characteristic curve 302 when the selection value k is 2, a second permissible rotational speed N2 is acquired, and for a third characteristic curve 303 when the selection value k is 3, a third permissible rotational speed N3 is acquired.

Note that, in FIG. 3, the fact is shown that when the environmental temperature Ta is less than a reference environmental temperature T0, and the engine rotational speed Ne is less than a threshold rotational speed N0 on the first characteristic curve 301, the selection value k=1 can be selected.

In FIG. 4 for illustrating a structure of the data table when the first characteristic curve 301, the second characteristic curve 302, and the third characteristic curve 303 of FIG. 3 are represented as a table, on the top row, the environmental temperature Ta is divided into 15 stages of from −30° C. to 110° C.

The next row, "selection 1", represents actual values D11 to D15 of the permissible engine rotational speed Nk corresponding to the respective environmental temperature Ta on the first characteristic curve 301 for the selection value k=1.

In the same way, the bottom row, "selection 3" represents actual values D31 to D35 of the permissible engine rotational speed Nk corresponding to the respective environmental temperature Ta on the third characteristic curve 303 for the selection value k=3.

When the reference data 400, which is the data table, is actually used, the first permissible rotational speed N1, the second permissible rotational speed N2, or the third permissible rotational speed N3 corresponding to the actual measured environmental temperature Tx is determined through interpolation using the permissible rotational speeds corresponding to the environmental temperatures Ta before and after the measured temperature Tx.

Note that, as the reference data 400, a data table such as the data table shown in FIG. 4 or an approximation equation replacing the table may be used.

Figure 5:
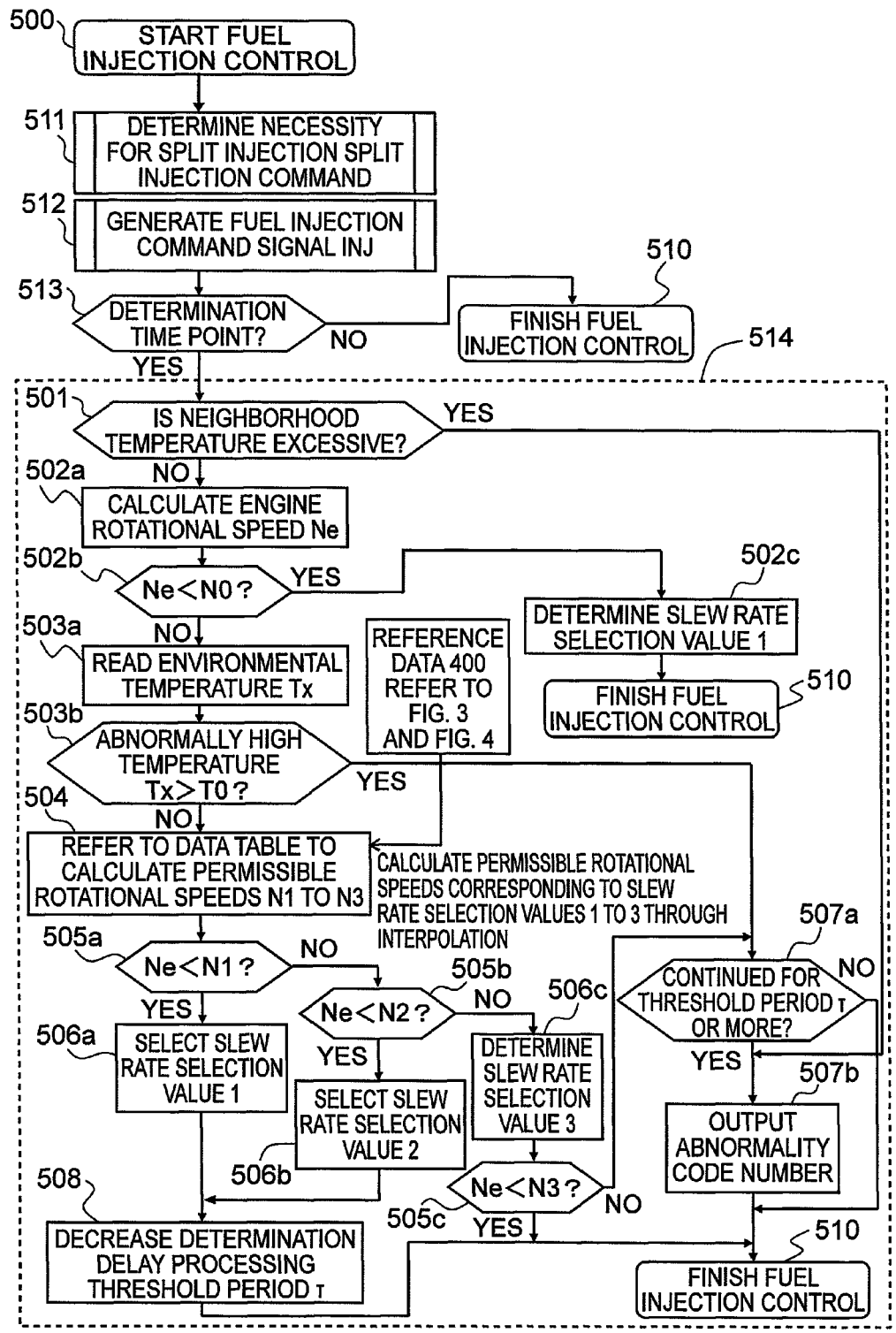
FIG. 5 is a flowchart for illustrating an operation of the apparatus of FIG. 1.

A description is now given of FIG. 5, which is a flowchart for illustrating an operation of the apparatus of FIG. 1. In FIG. 5, Step 500 is a step in which the microprocessor CPU starts a fuel injection control operation. The microprocessor CPU proceeds from this start step to an operation end step, which is Step 510 described later, executes another control program, returns again to Step 500, and repeats the subsequent steps, and a repetition cycle thereof is shorter than a fuel injection interval at the maximum rotational speed of the engine.

Step Block 511, which follows, serves as split injection command means for determining whether or not to carry out the split injection control based on the current operation state, and, on this occasion, determining whether or not to carry out a one batch injection or two split injections in each fuel cycle of the engine.

In Step Block 512, which follows, depending on the determination made in Step Block 511, the fuel injection command means generates the fuel injection command signal INJi once or twice in each fuel cycle of the engine, and based on a generation time point and a generation period of the fuel injection command signal INJi, a timing of the fuel injection and a fuel injection period are determined.

Step 513, which follows, is a determination step of determining whether or not a time point of carrying out slew rate selection means, which is Step Block 514 constructed by Steps 501 to 508, is reached, and, for example, making a determination of "YES" at an interval of a few seconds and proceeding to Step 501, and making a determination of "NO" at a time point other than this time point and proceeding to Step 510 of the operation end.

Step 501 is neighborhood temperature determination means for determining whether or not the measured neighborhood temperature Ty detected by the neighborhood temperature detection device 119 is more than a management target value acquired by subtracting a predetermined margin from a permissible limit temperature Tjmax inside the boost switching device 115, when Ty is more than the management target value, making a determination of "YES" and proceeding to Step 507b, and storing the generation of a high temperature abnormality determination signal, and, when Th is not more than the management target value, making a determination of "NO" and proceeding to Step 502a.

Step 502a is a step of measuring a pulse generation frequency by the engine rotational sensor 105e to calculate the current engine rotational speed Ne, and proceeding to Step 502b.

Step 502b is a determination step of determining whether or not the engine rotational speed Ne calculated in Step 502a is less than a predetermined threshold rotational speed N0, when Ne is less than N0, making a determination of "YES" and proceeding to Step 502c, and, when Ne is equal to or more than N0, making a determination of "NO" and proceeding to Step 503a.

Note that, the threshold rotational speed N0 is an engine rotational speed which is, when the engine rotational speed is less than the threshold rotational speed N0, confirmed that the temperature increase of the boost switching device 115 is small and the internal temperature of the boost switching device 115 does not become more than the permissible limit value Tjmax even when the lowest value of the slew rate is selected.

Step 502c serves as minimum selection value application means for specifying the selection value 1 at the lowest level as the selection value of the slew rate for the slew rate selection circuit 115s.

Step 503a is a step of reading the measured environmental temperature Tx detected by the environmental temperature detection device 139 and proceeding to Step 503b.

Step 503b serves as high temperature environment determination means for determining whether or not the measured environmental temperature Tx read in Step 503a is more than the predetermined reference environmental temperature T0, when Tx is more than T0, making a determination of "YES" and proceeding to Step 507a, and when Tx is not more than T0, making a determination of "NO" and proceeding to Step 504.

Step 504 is a step of calculating, in correspondence to the measured environmental temperature Tx read in Step 503a and the selection values k=1 to 3 of the slew rate, the permissible engine rotational speeds N1, N2, and N3 through interpolation from the data table of FIG. 4 serving as the reference data 400 stored in the program memory PRG, and proceeding to Step 505a.

Step 505a is a determination step of determining whether or not the current engine rotational speed Ne calculated in Step 502a is less than the first permissible rotational speed N1 calculated in Step 504, when Ne is less than N1, making a determination of "YES" and proceeding to Step 506a, and when Ne is not less than N1, making a determination of "NO" and proceeding to Step 505b.

Step 506a is a step of selecting 1 as the selection value k of the slew rate and proceeding to Step 508. Step 505b is a determination step of determining whether or not the current engine rotational speed Ne calculated in Step 502a is less than the second permissible rotational speed N2 calculated in Step 504, when Ne is less than N2, making a determination of "YES" and proceeding to Step 506b, and when Ne is not less than N2, making a determination of "NO" and proceeding to Step 506c.

Step 506b is a step of selecting 2 as the selection value k of the slew rate and proceeding to Step 508. Step 506c is a step of selecting 3 as the selection value k of the slew rate and proceeding to Step 505c. Step 505c is a determination step of determining whether or not the current engine rotational speed Ne calculated in Step 502a is less than the third permissible rotational speed N3 calculated in Step 504, when Ne is less than N3, making a determination of "YES" and proceeding to Step 510 of the operation end, and when Ne is not less than N3, making a determination of "NO" and proceeding to Step 507a.

Step 507a is a determination step of determining whether or not the abnormal determination in Step 503b or 505c continues for more than a predetermined threshold period τ, when the abnormal determination continues, making a determination of "YES" and proceeding to Step 507b, and when the abnormality does not continue, making a determination of "NO" and proceeding to Step 510 of the operation end.

Step 507b serves as abnormality notification means for generating an abnormality notification output when it is determined in Step 501 that the neighborhood temperature is abnormally high, generating the abnormality notification output when the generation state of the environmental abnormality determination signal in Step 503b continues for the predetermined threshold period τ or more, or when the state in which the current engine rotational speed Ne is too high determined in Step 505c continues for the predetermined threshold period τ or more even when the selection value k is set to the maximum value in Step 506c, thereby carrying out at least one of storage of abnormality occurrence information or stop of the multi-time injection control, and proceeding to Step 510 of operation end.

Step 508 serves as decrease selection delay processing means for enabling decrease processing for the selection value k when the selections of Step 506a and Step 506b are the decrease selection command of selecting a smaller value than the current value for the selection value k, and the generation of the decrease selection command still continues after the predetermined threshold period τ, and when the selection in Step 506b is an increase selection, immediately enabling the increase selection, and proceeding to Step 510 of the operation end.

Note that, the value of the predetermined threshold period τ applied in the abnormality notification means 507b or the decrease selection delay processing means 508 is a value equal to or more than a thermal time constant τ0 relating to an internal average temperature of the boost switching device 115. Further, the thermal time constant τ0 is a physical constant corresponding to an elapsed period from a steep increase or a steep decrease in power consumption of the boost switching device 115 by a difference ΔP to occurrence of a temperature variation of 63% of a temperature difference ±ΔTmax while the internal average temperature of the switching device saturates after a temperature increase by the temperature increase value +ΔTmax or a temperature decrease by the temperature decrease value −ΔTmax.

In the above description, in Steps 505a, 505b, and 505c of determining whether the engine rotational speed Ne is high, medium, or small, the determination for a high, medium, or small rotational speed is immediately made based on one comparison result. However, for example, such confirmation determination means may be added that, in the calculation cycle from Step 500 of the operation start to Step 510 of the operation end, when the determination of "YES" or "NO" based on the comparison result is the same in the two successive calculation cycles, the determination is settled to "YES" or "NO", and the previous determination is prioritized when the determination based on the comparison result is not successive.

Moreover, when a multi-stage split injection is required as in a diesel engine, as the boost control circuit 110, two combination circuits including the inductive device 112, the boost switching device 115, and the charge diode 113 may be provided for one high voltage capacitor 114 so that the pair of the boost switching devices may be alternately intermittently operated to quickly charge the high voltage capacitors and to suppress the temperature increase in the respective boost switching devices.

In this case, the neighboring temperature detection device 119 may be provided to one of the boost switching devices so as to represent the neighboring temperature detection device for both of the boost switching devices.

Moreover, the quick charge switching device or the power supply switching device may each have a configuration in which two switching devices are connected in parallel and are alternately driven to close, resulting in suppression of the temperature increase.

Moreover, the current supply switching device may use, in a regenerative manner, the charged energy of an electromagnetic coil to charge the high voltage capacitor in place of the quick shutoff method using the voltage limit diode, to thereby suppress the power consumption.

As apparent from the above description, the in-vehicle engine control apparatus according to the first embodiment of the present invention includes: the drive control circuit unit 120 including the plurality of switching devices 121j, 122j, and 123i for sequentially driving, in order to sequentially drive the electromagnetic valves for fuel injection, which are provided to the respective cylinders i (i=1, 2, . . . , n) of the multi-cylinder engine, the plurality of electromagnetic coils 103i for driving the electromagnetic valves to open; the boost control circuit unit 110 for generating the boosted high voltage Vh for quickly magnetizing the electromagnetic coil 103i; and the calculation control circuit unit 130 including the microprocessor CPU and the program memory PGM as principal components. The program memory PGM includes the control program to serve as the fuel injection command means 512 for generating the fuel injection command signal INJi directed to the plurality of switching devices 121j, 122j, and 123i and the split injection command means 511 for determining whether the fuel injection command signal INJi is to be generated once or a plurality of times during each fuel cycle period of one cylinder of the multi-cylinder engine. The boost control circuit unit 110 includes the inductive device 112 to be intermittently magnetized by the boost switching device 115 from the in-vehicle battery 101 and the high voltage capacitor 114 to be charged to the boosted high voltage Vh set as the target by a plurality times of the discharge operation in which the electromagnetic energy accumulated in the inductive device 112 is discharged when the boost switching device 115 is opened. The boost switching device 115 includes the slew rate selection circuit 115s for selecting the slew rate, which is the current increase rate after the close command signal is fed, among the plurality of stages, which are one of the high and low stages and the high, medium, and low stages. The program memory PGM further includes the control program to serve as the slew rate selection means 514 for specifying the selection value k of the slew rate for the slew rate selection circuit 115s and the reference data 400, which is one of a data table and an approximation equation.

In addition, the reference data 400 includes, as the combination data on the plurality of stages, the numerical data of the permissible engine rotational speed Nk determined by using the selection value k specified for the slew rate selection circuit 115s as the parameter, and using the measured environmental temperature Tx relating to the installation environment of the boost switching device 115 detected by the environmental temperature detection device 139 as the variable. The permissible engine rotational speed Nk is the statistical data acquired by experimentally confirming that the internal temperature of the boost switching device 115 is equal to or less than the predetermined permissible limit temperature Tjmax even when, at the measured environmental temperature Tx, the selection value k of the slew rate is applied and a continuous operation is carried out while the injection is carried out for a plurality of times. The slew rate selection means 514 is configured to compare the value of the engine rotational speed Ne detected by the engine rotation sensor 105e and the value of the permissible engine rotational speed Nk corresponding to the current measured environmental temperature Tx calculated through the interpolation from the reference data 400 with each other, to thereby determine the selection value k. The calculation control circuit unit 130 is configured to select the selection value k of the slew rate as small as possible under the condition that the internal temperature of the boost switching device 115 corresponding to the current engine rotational speed Ne and the current measured environmental temperature Tx is equal to or less than the predetermined permissible limit temperature Tjmax, to thereby suppress the current increase rate of the switching device.

The program memory PGM further includes the control program to serve as the minimum selection value application means 502c. The minimum selection value application means 502c is configured to specify, when the engine rotational speed Ne detected by the engine rotational sensor 105e is less than the predetermined threshold rotational speed N0, the selection value of 1 at the lowest level as the selection value of the slew rate for the slew rate selection circuit 115s. When the engine rotational speed is less than the predetermined threshold rotational speed N0, it is confirmed that the temperature increase of the boost switching device 115 is small and the internal temperature of the boost switching device does not become more than the permissible limit value Tjmax even when the lowest value of the slew rate is selected.

As described above, according to claim 2, the minimum selection value application means is configured to specify, when the engine rotational speed is less than the predetermined threshold rotational speed N0, the selection value at the lowest level as the selection value of the slew rate.

Thus, such a feature is provided that, in a normal cruising operation, the selection value level of the slew rate may be determined to be the selection value of 1 for the operation without complex calculations.

The program memory PGM further includes the control program to serve as the abnormality notification means 507b and the high temperature environment determination means 503b. The high temperature environment determination means 503b is configured to generate the environment abnormality determination signal when the measured environmental temperature Tx detected by the environmental temperature detection device 139 exceeds the predetermined reference environmental temperature T0. The abnormality notification means 507b is configured to generate the abnormality notification output one of when the state in which the environment abnormality determination signal is generated continues for the predetermined threshold period τ or more and when the state in which the current engine rotational speed Ne is higher than the permissible engine rotational speed Nk acquired by referring to the current measured environmental temperature Tx and the reference data 400 continues for the predetermined threshold period τ or more after the selection value k is set to the maximum level. As a result, at least one of the storage of the abnormality occurrence information or the stop of the multi-time injection control is carried out.

As described above, according to claim 3, when the environmental temperature detected by the environmental temperature detection device is abnormally high, or when the selection value level of the slew rate is set to the maximum level, but the operation at an engine rotational speed more than the permissible rotational speed calculated from the reference data continues, the abnormality notification output is generated.

Thus, such a feature is provided that when the abnormality notification output is generated, the multi-time injection control may be stopped to suppress the temperature increase in the boost switching device, or abnormality generation history information may be stored.

The program memory PGM further includes the control program to serve as the decrease selection delay processing means 508. The decrease selection delay processing means 508 is configured to carry out processing for decreasing the selection value k when, in the case where the slew rate selection means 514 generates the decrease selection command to select a small value as the selection value k as a result of one of the decrease in the engine rotational speed Ne and the decrease in the measured environmental temperature Tx, the generation of the decrease selection command still continues even after the predetermined threshold period T.

As described above, according to claim 4, when the selection value of the slew rate is changed to decrease, the processing for decreasing the selection value is carried out after the predetermined threshold period has elapsed.

Thus, when the selection value of the slew rate is changed to decrease, a transient loss during the closing of the boost switching device increases. However, the selection value of the slew rate is changed to decrease after it is confirmed that the engine rotational speed or the environmental temperature decreases and the internal temperature of the boost switching device accordingly decreases. Therefore, such a feature is provided that the internal temperature of the boost switching device does not abnormally increase.

The value of the predetermined threshold period τ to be applied in one of the abnormality notification means 507b and the decrease selection delay processing means 508 is equal to or more than the thermal time constant τ0 relating to the internal average temperature of the boost switching device 115. The thermal time constant τ0 is the physical constant corresponding to the elapsed period from one of a steep increase and a steep decrease in power consumption of the boost switching device 115 by the difference ΔP to the occurrence of the temperature variation of 63% of the temperature difference value ΔTmax while the internal average temperature of the switching device saturates after one of the temperature increase by the temperature increase value +ΔTmax and the temperature decrease by the temperature decrease value −ΔTmax.

As described above, according to claim 5, the predetermined threshold period τ, which is a determination wait period when the abnormality notification means determines an abnormality or a determination wait period until the decrease selection delay processing means carries out the decrease processing, is equal to or more than the thermal time constant τ0 of the internal average temperature of the boost switching device.

Thus, such a feature is provided that the abnormality determination is not made by mistake and the processing for decreasing the selection value, which may result in an abnormal increase in a local temperature of the boost switching device, is not indiscriminately carried out.

The multi-cylinder engine is grouped into the first cylinder group having odd numbers and the second cylinder group having even numbers for which the fuel injection is alternately carried out. The plurality of switching devices for driving the electromagnetic coils $103i$ (i=1, 2, . . . , n) include the current supply switching devices $123i$ each connected to each of the electromagnetic coils $103i$, and the pair of the quick power supply switching device $122j$ (j=1, 2) and the power supply switching device $121j$ (j=1, 2) shared by the electromagnetic coils $103i$ of one of the first cylinder group and the second cylinder group. The quick power supply switching device $122j$ is configured to apply the boosted high voltage Vh to the upstream terminal of the electromagnetic coils $103i$ of one of the first cylinder group and the second cylinder group in the predetermined period immediately after the generation of the fuel injection command signal INJi, to thereby supply the quick magnetization current. The power supply switching device $121j$ is configured to intermittently apply, during the period in which the fuel injection command signal INJi is generated, the power supply voltage Vbb of the in-vehicle battery 101 to the upstream terminal of the electromagnetic coils $103i$ of one of the first cylinder group and the second cylinder group via the backflow prevention diode $125j$, to thereby supply the open maintenance current. The current supply switching devices $123i$ are configured to connect, during the period in which the fuel injection command signal INJi is generated, the respective downstream side terminals of the electromagnetic coils $103i$ to the ground circuit. Each of switching devices subject to monitoring, which are one of a part and an entirety of the plurality of switching devices $121j$, $122j$, and $123i$, includes the slew rate selection circuit $127j$ for selecting the slew rate, which is the current increase rate after the close command signal is fed, among the plurality of stages, which are one of high and low stages and high, medium, and low stages. The slew rate selection circuit $127j$ is configured to variably set the selection value k based on the slew rate selection command fed to the slew rate selection circuit $127s$ of the boost switching device 115.

As described above, according to claim 6, a part or an entirety of the switching devices for driving to open the electromagnetic coils includes the slew rate selection circuit, and the slew rate is variably set in association with the boost switching device.

Thus, such a feature is provided that while the temperature increase in the switching device for the power supply control at a high rotational speed is suppressed, the radio noise is suppressed at a low rotational speed.

Note that, while a switching frequency of the switching device for the power supply control is lower than the switching frequency of the boost switching device and the power supply switching devices are at least divided and provided for the first cylinder group and the second cylinder group, the boost switching device is shared by all the electromagnetic coils, and hence the selection control for the slew rate focusing on the boost switching device only needs to be carried out in terms of the temperature increase. Therefore, such a feature is provided that an additional effect is easily provided.

The calculation control circuit unit 130, the boost control circuit unit 110, and the drive control circuit unit 120 are mounted on the circuit board 200 stored in the housing 109.

The environmental temperature detection device 139 is mounted on the circuit board 200 in the temperature distribution area lower in the temperature than the average temperature relating to the temperature distribution in the housing 109, and is configured to measure the environmental temperature Ta of the boost switching device at the location not neighboring the high heat generation component including at least the boost switching device 115.

As described above, according to claim 7, the environmental temperature detection device is provided at the location not neighboring the boost switching device, and is configured to measure the environmental temperature for the boost switching device.

Thus, a temperature increase value of the boost switching device is approximately determined by a magnitude of the engine rotational speed, and the internal temperature of the boost switching device is estimated by adding the temperature increase value to the measured environmental temperature. Therefore, such a feature is provided that when the permissible values of the engine rotational speed at which the internal temperature is equal to or less than the predetermined permissible limit value for given environmental temperatures are generated as the reference data in advance, the permissible rotational speed may be calculated easily on an actual engine operation stage without the calculation for the estimation of the internal temperature.

Note that, when the neighborhood temperature detection device is provided at a location closest to the boost switching device, the result of the sum of the temperature increase value of the boost switching device and the environmental temperature is measured, and the distribution thereof is thus unknown. Therefore, when the engine rotational speed is changed, the internal temperature needs to be determined based on the execution result, and hence there is a problem in that an unreasonable high speed operation cannot be avoided through the estimation.

The in-vehicle engine control apparatus further includes the neighborhood temperature detection device 119 arranged at the location closest to the boost switching device 115. The program memory PGM further includes the control program to serve as the neighborhood temperature determination means 501. The neighborhood temperature detection device 119 is configured to estimate the internal average temperature of the boost switching device 115. The measured neighborhood temperature Ty detected by the neighborhood temperature detection device is input to the microprocessor CPU. The neighborhood temperature determination means 501 is configured to generate the high temperature abnormality determination signal when the value of the measured neighborhood temperature Ty is more than the management target value acquired by subtracting the predetermined margin from the predetermined permissible limit temperature Tjmax inside the boost switching device 115. The abnormality notification means 507b is configured to generate the abnormality notification output when the neighborhood temperature determination means 501 generates the high temperature abnormality determination signal, to thereby carry out at least one of the storage of the abnormality occurrence information or the stop of the multi-time injection control.

As described above, according to claim 8, the neighborhood temperature detection device for detecting the temperature of the location closest to the boost switching device is provided in parallel, and as a result, when the measured neighborhood temperature detected by the neighborhood temperature detection device becomes more than the predetermined management target value, the abnormality notification output is generated.

Thus, such a feature is provided that when the abnormality notification output is generated, the multi-time injection control is stopped to suppress the increase in the temperature of the boost switching device, and whether the generation of the abnormality is caused by the high temperature abnormality determined by the neighborhood temperature determination means, the environment abnormality determined by the high temperature environment determination means, or the high rotation abnormality in which the actual engine rotational speed is higher than the permissible engine rotational speed calculated from the reference data may be identified to store the abnormality generation history information.

Moreover, the high temperature determination based on the neighboring temperature has such a feature that the high temperature state of the inside of the boost switching device may be detected more directly than the environmental temperature abnormality determination and the high rotation abnormality determination.

Note that, a local temperature at a junction of the boost switching device increases more quickly than the thermal time constant τ0 relating to the internal average temperature of the boost switching device. Thus, even when a margin of the temperature exists, it is not desirable to generate an excessive power consumption only depending on the neighborhood temperature determination means. In view of this, such a feature is provided that an erroneous determination caused by a control error may be prevented by mainly employing the environment abnormality determination based on the high environmental temperature determination and the high speed rotation abnormality determination based on the reference data, and employing the high temperature determination in an auxiliary manner in parallel.

What is claimed is:

1. An in-vehicle engine control apparatus, comprising:
    a drive control circuit unit comprising a plurality of switching devices for sequentially driving electromagnetic coils of fuel injectors provided for respective cylinders of a multi-cylinder engine, in order to cause electromagnetic valves of said fuel injectors to open;
    a boost control circuit unit for generating a boosted high voltage for quickly magnetizing one of the plurality of electromagnetic coils; and
    a calculation control circuit unit comprising a microprocessor and a program memory as principal components,
    the program memory storing a control program controlling the generation of fuel injection command signals directed to the plurality of switching devices and for determining whether a given fuel injection command signal is to be generated once or a plurality of times during each fuel cycle period of one cylinder of the multi-cylinder engine,
    the boost control circuit unit comprising an inductive device to be intermittently magnetized by a boost switching device from an in-vehicle battery when the boost switching device is closed and a high voltage capacitor to be charged to a target voltage by a plurality of inductive device discharge operations in which electromagnetic energy accumulated in the inductive device is discharged when the boost switching device is opened,
    the boost switching device comprising a slew rate selection circuit for selecting a slew rate, which is a current increase rate through said boost switching device after a close command signal is fed to said boost switching device, from among a plurality of different boost switching device slew rate values,
    the program memory further comprising a control program and reference data, the control program serving to specify a selection value of the slew rate for the slew rate selection circuit, and the reference data comprising one of a data table and an approximation equation,
    the reference data comprising numerical data of a maximum permissible engine rotational speed determined by using the selection value specified for the slew rate selection circuit as a parameter, and using a measured environmental temperature relating to an operating environment of the boost switching device detected by an environmental temperature detector as a variable,
    the maximum permissible engine rotational speed being a largest speed such that an internal temperature of the boost switching device will be equal to or less than a predetermined permissible limit temperature even when, at the measured environmental temperature, the selection value of the slew rate is applied and a continuous operation is carried out while injection is carried out for a plurality of times, said maximum permissible engine rotational speed being based on statistical data of operating experiments,
    the control program being configured to compare a value of an engine rotational speed detected by an engine rotation sensor and a value of a maximum permissible engine rotational speed corresponding to a current measured environmental temperature to thereby determine the selection value, said maximum permissible engine rotational speed being calculated through interpolation from the reference data,
    the calculation control circuit unit being configured to select the selection value of the slew rate as small as possible under a condition that the internal temperature of the boost switching device, that will correspond to a current engine rotational speed and current measured environmental temperature, is equal to or less than the predetermined permissible limit temperature, to thereby suppress the current increase rate of the boost switching device.

2. An in-vehicle engine control apparatus according to claim 1, wherein:
    the control program is further configured to perform a minimum selection value application function comprising specifying, when the engine rotational speed detected by the engine rotational sensor is less than a predetermined threshold rotational speed, the selection value at a lowest of said plurality of boost switching device slew rate values as the selection value of the slew rate for the slew rate selection circuit; and
    the threshold rotational speed is an engine rotational speed such that, when the engine rotational speed is less than the threshold rotational speed, the internal temperature of the boost switching device does not become more than a permissible limit value even when said lowest value of the slew rate is selected.

3. An in-vehicle engine control apparatus according to claim 1, wherein:
    the control program is further configured to perform abnormality notification and high temperature environment determination functions;
    the high temperature environment determination function comprises generating an environment abnormality determination signal when the measured environmental temperature detected by the environmental temperature detector exceeds a predetermined reference environmental temperature; and the abnormality notification function comprises generating an abnormality notification output upon the occurrence of one of
- a state in which the environment abnormality determination signal is generated continues for at least a predetermined threshold period and
- a state in which the current engine rotational speed is higher than the permissible engine rotational speed acquired by referring to the current measured environmental temperature and the reference data continues for the predetermined threshold period or more after the selection value is set to a maximum level, to thereby carry out at least one of
- (a) storage of abnormality occurrence information or
- (b) stopping of multi-time injection control where the given fuel injection command signal is to be generated a plurality of times during each fuel cycle period of one cylinder of the multi-cylinder engine.

4. An in-vehicle engine control apparatus according to claim 3, wherein:
a value of said predetermined threshold period is equal to or more than a thermal time constant relating to an internal average temperature of the boost switching device; and
the thermal time constant comprises a physical constant corresponding to an elapsed period from a change in power consumption of the boost switching device by a difference $\Delta P$ to occurrence of a temperature variation of 63% of a temperature difference value $\Delta Tmax$, where $\Delta Tmax$ is a temperature difference such that the internal average temperature of the switching device saturates after one of a temperature increase by a temperature increase value $+\Delta Tmax$ and a temperature decrease by a temperature decrease value $-\Delta Tmax$.

5. An in-vehicle engine control apparatus according to claim 3, further comprising a neighborhood temperature detector arranged at a location closest to the boost switching device, wherein:
the neighborhood temperature detector is configured to provide to said microprocessor an estimate of an internal average temperature of the boost switching device;
the control program is further configured to perform a neighborhood temperature determination function comprising generating a high temperature abnormality determination signal when a value of the measured neighborhood temperature is more than a management target value acquired by subtracting a predetermined margin from the predetermined permissible limit temperature inside the boost switching device; and
the abnormality notification function generates an abnormality notification output when the high temperature abnormality determination signal is generated, to thereby carry out at least one of the (i) storage of the abnormality occurrence information or (ii) the stopping of the multi-time injection control.

6. An in-vehicle engine control apparatus according to claim 2, wherein:
the control program is further configured to perform abnormality notification and high temperature environment determination functions;
the high temperature environment determination function comprising generating an environment abnormality determination signal when the measured environmental temperature detected by the environmental temperature detector exceeds a predetermined reference environmental temperature; and
the abnormality notification function comprises generating an abnormality notification output upon the occurrence of one of
- (i) a state in which the environment abnormality determination signal is generated continues for a predetermined threshold period or more and
- (ii) a state in which the current engine rotational speed is higher than the permissible engine rotational speed acquired by referring to the current measured environmental temperature and the reference data continues for the predetermined threshold period or more after the selection value is set to a maximum level, to thereby carry out at least one of (i) storage of abnormality occurrence information or (ii) stopping of multi-time injection control where the given fuel injection command signal is to be generated a plurality of times during each fuel cycle period of one cylinder of the multi-cylinder engine.

7. An in-vehicle engine control apparatus according to claim 6, wherein:
a value of the predetermined threshold is equal to or more than a thermal time constant relating to an internal average temperature of the boost switching device; and
the thermal time constant comprises a physical constant corresponding to an elapsed period from a change in power consumption of the boost switching device by a difference $\Delta P$ to occurrence of a temperature variation of 63% of a temperature difference value $\Delta Tmax$, where $\Delta Tmax$ is a temperature difference such that the internal average temperature of the switching device saturates after one of a temperature increase by a temperature increase value $+\Delta Tmax$ and a temperature decrease by a temperature decrease value $-\Delta Tmax$.

8. An in-vehicle engine control apparatus according to claim 6, further comprising a neighborhood temperature detector arranged at a location closest to the boost switching device, wherein:
the neighborhood temperature detector is configured to provide to said microprocessor an estimate of an internal average temperature of the boost switching device;
the control program is further configured to perform a neighborhood temperature determination function comprising generating a high temperature abnormality determination signal when a value of the measured neighborhood temperature is more than a management target value acquired by subtracting a predetermined margin from the predetermined permissible limit temperature inside the boost switching device; and
the abnormality notification function comprises generating said abnormality notification output when the high temperature abnormality determination signal is generated, to thereby carry out at least one of (i) the storage of the abnormality occurrence information or (ii) the stop of the multi-time injection control.

9. An in-vehicle engine control apparatus according to claim 1, wherein:
the control program is further configured to perform a decrease selection delay processing function comprising carrying out processing for decreasing the selection value when, in a case where the slew rate selection function of said control program generates a decrease selection command to select a lower one of said different boost switching device slew rate values as the selection value as a result of one of (i) a decrease in the engine rotational speed and (ii) a decrease in the measured environmental temperature, the generation of the decrease selection command still continues even after a predetermined threshold period.

10. An in-vehicle engine control apparatus according to claim 9, wherein:
a value of the predetermined threshold period is equal to or more than a thermal time constant relating to an internal average temperature of the boost switching device; and
the thermal time constant comprises a physical constant corresponding to an elapsed period from a change in power consumption of the boost switching device by a difference $\Delta P$ to occurrence of a temperature variation of 63% of a temperature difference value $\Delta Tmax$, where $\Delta Tmax$ is a temperature such that the internal average temperature of the switching device saturates after one of a temperature increase by a temperature increase value $+\Delta Tmax$ and a temperature decrease by a temperature decrease value $-\Delta Tmax$.

11. An in-vehicle engine control apparatus according to claim 2, wherein:
the control program is further configured to perform a decrease selection delay processing function comprising carrying out processing for decreasing the selection value when, in a case where the slew rate selection function of said control program generates a decrease selection command to select a lower one of said different boost switching device slew rates as the selection value as a result of one of (i) a decrease in the engine rotational speed and (ii) a decrease in the measured environmental temperature, the generation of the decrease selection command still continues even after a predetermined threshold period.

12. An in-vehicle engine control apparatus according to claim 11, wherein:
a value of the predetermined threshold period is equal to or more than a thermal time constant relating to an internal average temperature of the boost switching device; and
the thermal time constant comprises a physical constant corresponding to an elapsed period from a change in power consumption of the boost switching device by a difference $\Delta P$ to occurrence of a temperature variation of 63% of a temperature difference value $\Delta Tmax$, where $\Delta Tmax$ is a temperature such that the internal average temperature of the switching device saturates after one of a temperature increase by a temperature increase value $+\Delta Tmax$ and a temperature decrease by a temperature decrease value $-\Delta Tmax$.

13. An in-vehicle engine control apparatus according to claim 1, wherein:
the cylinders of the multi-cylinder engine are grouped into a first cylinder group having odd cylinder numbers and a second cylinder group having even cylinder numbers for which fuel injection is alternately carried out;
the plurality of switching devices for driving the plurality of electromagnetic coils comprise current supply switches each connected to one of the plurality of electromagnetic coils, and a pair of a quick power supply switch and a power supply switch shared by the plurality of electromagnetic coils of one of the first cylinder group and the second cylinder group;
the quick power supply switch is configured to apply the boosted high voltage to an upstream terminal of the electromagnetic coils of one of the first cylinder group and the second cylinder group in a predetermined period immediately after the fuel injection command signal is generated, to thereby supply a quick magnetization current;
the power supply switch is configured to intermittently apply, during a period in which the fuel injection command signal is generated, a power supply voltage of the in-vehicle battery to the upstream terminal of the electromagnetic coils of one of the first cylinder group and the second cylinder group via a backflow prevention diode, to thereby supply an open maintenance current;
the current supply switches are configured to connect, during the period in which the fuel injection command signal is generated, respective downstream side terminals of the electromagnetic coils to a ground circuit;
each of switching devices subject to monitoring, comprising at least a part of the plurality of switching devices, comprises a switching device slew rate selection circuit for selecting a switching device slew rate, which is a current increase rate through said each switching device after a close command signal is fed to said each switching device, from among a plurality of different switching device slew rate values; and
the switching device slew rate selection circuit is configured to variably set a selection value based on a slew rate selection command fed to the slew rate selection circuit of the boost switching device.

14. An in-vehicle engine control apparatus according to claim 2, wherein:
the cylinders of the multi-cylinder engine are grouped into a first cylinder group having odd cylinder numbers and a second cylinder group having even cylinder numbers for which fuel injection is alternately carried out;
the plurality of switching devices for driving the plurality of electromagnetic coils comprise current supply switches each connected to one of the plurality of electromagnetic coils, and a pair of a quick power supply switch and a power supply switch shared by the plurality of electromagnetic coils of one of the first cylinder group and the second cylinder group;
the quick power supply switch is configured to apply the boosted high voltage to an upstream terminal of the electromagnetic coils of one of the first cylinder group and the second cylinder group in a predetermined period immediately after the fuel injection command signal is generated, to thereby supply a quick magnetization current;
the power supply switch is configured to intermittently apply, during a period in which the fuel injection command signal is generated, a power supply voltage of the in-vehicle battery to the upstream terminal of the electromagnetic coils of one of the first cylinder group and the second cylinder group via a backflow prevention diode, to thereby supply an open maintenance current;
the current supply switches are configured to connect, during the period in which the fuel injection command signal is generated, respective downstream side terminals of the electromagnetic coils to a ground circuit;
each of switching devices subject to monitoring, which comprise at least a part of the plurality of switching devices, comprises a switching device slew rate selection circuit for selecting a slew rate, which is a current increase rate through said each switching device after a close command signal is fed to said each switching device, from among a plurality of different switching device slew rate values; and the switching device slew rate selection circuit is configured to variably set a selection value based on a slew rate selection command fed to the slew rate selection circuit of the boost switching device.

15. An in-vehicle engine control apparatus according to claim 1, wherein:
the calculation control circuit unit, the boost control circuit unit, and the drive control circuit unit are mounted on a circuit board stored in a housing; and
the environmental temperature detector is mounted on the circuit board in a temperature distribution area lower in temperature than an average temperature relating to a temperature distribution in the housing, and is configured to measure the environmental temperature of the boost switching device at a location not neighboring the boost switching device.

16. An in-vehicle engine control apparatus according to claim 2, wherein:
the calculation control circuit unit, the boost control circuit unit, and the drive control circuit unit are mounted on a circuit board stored in a housing; and
the environmental temperature detector is mounted on the circuit board in a temperature distribution area lower in temperature than an average temperature relating to a temperature distribution in the housing, and is configured to measure the environmental temperature of the boost switching device at a location not neighboring the boost switching device.

* * * * *